United States Patent
Watanabe et al.

(10) Patent No.: US 12,104,217 B2
(45) Date of Patent: Oct. 1, 2024

(54) GRAIN-ORIENTED ELECTRICAL STEEL SHEET AND PRODUCTION METHOD THEREFOR

(71) Applicant: JFE STEEL CORPORATION, Tokyo (JP)

(72) Inventors: Makoto Watanabe, Tokyo (JP); Masanori Takenaka, Tokyo (JP); Takashi Terashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 341 days.

(21) Appl. No.: 17/593,860

(22) PCT Filed: Mar. 27, 2020

(86) PCT No.: PCT/JP2020/014387
§ 371 (c)(1),
(2) Date: Sep. 27, 2021

(87) PCT Pub. No.: WO2020/203928
PCT Pub. Date: Oct. 8, 2020

(65) Prior Publication Data
US 2022/0170130 A1    Jun. 2, 2022

(30) Foreign Application Priority Data

Mar. 29, 2019  (JP) .................. 2019-068584

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/005* (2013.01); *C21D 6/008* (2013.01); *C21D 8/005* (2013.01);
(Continued)

(58) Field of Classification Search
None
See application file for complete search history.

(56) References Cited

U.S. PATENT DOCUMENTS

| 4,127,429 A | 11/1978 | Ichida et al. |
| 4,130,447 A | 12/1978 | Marianeschi et al. |

(Continued)

FOREIGN PATENT DOCUMENTS

| EP | 1811053 A1 | 7/2007 |
| EP | 3239324 A1 | 11/2017 |

(Continued)

OTHER PUBLICATIONS

Jun. 23, 2020, International Search Report issued in the International Patent Application No. PCT/JP2020/014387.
(Continued)

*Primary Examiner* — Xiaowei Su
(74) *Attorney, Agent, or Firm* — KENJA IP LAW PC

(57) ABSTRACT

Provided is a grain-oriented electrical steel sheet having a film that is effective for the magnetic properties of the steel sheet and particularly effective for iron loss reduction and has favorable adhesion. In a grain-oriented electrical steel sheet, an insulating film partially enters into a steel substrate to form an anchor part, a depth of the anchor part from the surface of the steel substrate is 3.5 μm or less, and a number of neck parts of 5 μm² or less in area is 0.06/μm² or less and a number of neck parts of 10 μm² to 40 μm² in area is 0.005/μm² or more and 0.011/μm² or less, where each neck part is a remaining part of the insulating film on the surface of the steel substrate when peeling the insulating film from the steel substrate in a bend test for the grain-oriented electrical steel sheet.

17 Claims, 5 Drawing Sheets

(51) Int. Cl.
- *C21D 8/00* (2006.01)
- *C21D 8/12* (2006.01)
- *C22C 38/00* (2006.01)
- *C22C 38/02* (2006.01)
- *C22C 38/04* (2006.01)
- *C22C 38/06* (2006.01)
- *C22C 38/16* (2006.01)
- *H01F 1/147* (2006.01)
- *H01F 1/18* (2006.01)
- *H01F 41/02* (2006.01)

(52) U.S. Cl.
CPC ......... *C21D 8/1222* (2013.01); *C21D 8/1233* (2013.01); *C21D 8/1272* (2013.01); *C21D 8/1283* (2013.01); *C22C 38/001* (2013.01); *C22C 38/02* (2013.01); *C22C 38/04* (2013.01); *C22C 38/06* (2013.01); *C22C 38/16* (2013.01); *H01F 1/14775* (2013.01); *H01F 1/18* (2013.01); *H01F 41/02* (2013.01); *C21D 2201/05* (2013.01); *C22C 2202/02* (2013.01)

(56) References Cited

U.S. PATENT DOCUMENTS

| | | | |
|---|---|---|---|
| 5,565,272 | A | 10/1996 | Masui et al. |
| 2020/0010917 | A1 | 1/2020 | Terashima et al. |
| 2020/0399732 | A1* | 12/2020 | Kataoka ................ C22C 38/001 |
| 2022/0081744 | A1* | 3/2022 | Yasuda ................ C21D 8/1233 |

FOREIGN PATENT DOCUMENTS

| | | |
|---|---|---|
| JP | S534714 A | 1/1978 |
| JP | S535800 A | 1/1978 |
| JP | H0617261 A | 1/1994 |
| JP | H09249916 A | 9/1997 |
| JP | H10152780 A | 6/1998 |
| JP | 2003213337 A | 7/2003 |
| JP | 2004238734 A | 8/2004 |
| JP | 6168173 B2 | 7/2017 |
| WO | 2018150791 A1 | 8/2018 |

OTHER PUBLICATIONS

May 17, 2022, the Extended European Search Report issued by the European Patent Office in the corresponding European Patent Application No. 20784106.5.

* cited by examiner

SEM image of film cross-section

SEM image of film cross-section

SEM image of steel sheet surface after bend test

20 μm

SEM image of steel sheet surface after bend test

20 μm

GRAIN-ORIENTED ELECTRICAL STEEL SHEET AND PRODUCTION METHOD THEREFOR

TECHNICAL FIELD

The present disclosure relates to a grain-oriented electrical steel sheet used for iron cores of transformers and other electrical devices, and to an insulating film formed on the surface of the grain-oriented electrical steel sheet and an advantageous formation method therefor.

BACKGROUND

Production of a grain-oriented electrical steel sheet typically involves subjecting a steel slab to hot rolling and then cold rolling, thereafter to decarburization annealing, and thereafter to final annealing for secondary recrystallization. In this process, the secondary recrystallization occurs during the final annealing, and giant crystal grains with the easy magnetization axis aligned with the rolling direction are generated.

The final annealing has various functions besides the secondary recrystallization, such as formation of a forsterite film as a result of reaction between MgO in an annealing separator and an oxidation layer mainly composed of $SiO_2$ formed during the decarburization annealing, and removal of impurities by purification.

The forsterite film is formed at high temperature during the final annealing. Hence, when the steel sheet is subsequently cooled to normal temperature, tension is applied to the steel substrate due to the difference in coefficient of thermal (heat) expansion between the film and the steel substrate.

In the steel substrate to which the tension is applied, the spin is aligned in a uniform direction by the magnetoelastic effect, and the magnetostatic energy increases. Consequently, magnetic domains are refined. The steel sheet having such steel substrate has reduced iron loss. On the other hand, in the case where the adhesion of the forsterite film is poor or the formation of the forsterite film is insufficient, it is difficult to apply an insulating coating to the steel sheet after the final annealing, or the forsterite film partially peels off, so that the insulation property and the rust resistance degrade. Thus, the quality of the forsterite film is an important factor that affects the magnetic properties and film properties of the grain-oriented electrical steel sheet.

In view of this, various methods have conventionally been disclosed for improvement in film quality. For example, JP H9-249916 A (PTL 1) discloses a method whereby an annealing separator obtained by adding at least one additive to MgO with an average particle size of 0.3 μm to 3 μm and adjusting the average particle size of the additive in a range of 0.03 μm to 15 μm depending on the additive is used.

JP 2003-213337 A (PTL 2) discloses a method whereby an annealing separator additive that satisfies $1.1 \leq \rho SD/6 \leq 4$ is used, where D (μm) is the average particle size, S ($m^2/g$) is the BET specific surface area, and ρ ($g/cm^3$) is the true density.

JP H6-17261 A (PTL 3) discloses a method whereby a film formed during secondary recrystallization annealing is composed of a forsterite film and an oxide containing Al and/or Si to enhance the tension effect and improve the magnetic properties.

JP S53-5800 A (PTL 4) discloses a method whereby the size of forsterite particles forming a forsterite insulating film is defined to form a uniform film.

CITATION LIST

Patent Literature

PTL 1: JP H9-249916 A
PTL 2: JP 2003-213337 A
PTL 3: JP H6-17261 A
PTL 4: JP S53-5800 A

SUMMARY

Technical Problem

The method described in PTL 1 can improve the quality of the film as a whole, but has the problem in that desired film properties cannot be obtained in some cases despite the average particle size being within the range disclosed in PTL 1. Likewise, the method described in PTL 2 has the problem in that, despite the average particle size of the additive being defined, desired film properties cannot always be obtained due to variations in the particle size of the powder.

The method described in PTL 3 has the problem in that, when an external force is exerted on the steel sheet, cracking occurs at the interface between the forsterite film and the oxide containing Al and/or Si and the film degrades. The method described in PTL 4 does not have a sufficient film improving effect, because simply controlling the forsterite particle size to a specific range produces only a limited effect.

To solve these problems, we proposed in JP H10-152780 A (PTL 5) a method whereby a forsterite film partially enters into a steel substrate and forms an anchor part, and the area ratio of the remaining parts of the film on the surface of the steel substrate when peeling the film in a bend test for the steel sheet is specified.

PTL 5: JP H10-152780 A

Thus, the film adhesion is improved. However, the magnetic property improving effect is insufficient. In particular, despite high magnetic flux density, the hysteresis loss is not reduced effectively, as a result of which the iron loss tends to be rather high.

While the film properties and the magnetic properties have been improved to some extent by various techniques as mentioned above, such improvements are not sufficient. Especially, during the process from decarburization annealing to final annealing, slight changes in process conditions are likely to adversely affect the magnetic properties or the film properties. Therefore, improvement in the quality of the film formed during the process from decarburization annealing to final annealing is strongly needed.

It could therefore be helpful to provide a grain-oriented electrical steel sheet having a film that contributes to improved magnetic properties of the steel sheet and in particular to reduced iron loss and has favorable adhesion, together with an advantageous method of obtaining the film.

Solution to Problem

1. A grain-oriented electrical steel sheet comprising an insulating film formed on a surface of a steel substrate of the grain-oriented electrical steel sheet, wherein the insulating film partially enters into the steel substrate to form an anchor part, a depth of the anchor part from the surface of the steel substrate is 3.5 μm or less, and a number of neck parts of 5 μm² or less in area is 0.06/μm² or less and a number of neck parts of 10 μm² to 40 μm² in area is 0.005/μm² or more and 0.011/μm² or less, where each neck part is a remaining part of the insulating film on the surface of the steel substrate when peeling the insulating film from the steel substrate in a bend test for the grain-oriented electrical steel sheet.

2. A production method for the grain-oriented electrical steel sheet according to 1, the production method comprising: subjecting a steel containing 2 mass % to 4 mass % of Si to hot rolling to obtain a steel sheet; subjecting the steel sheet to cold rolling once, or twice or more with intermediate annealing therebetween, into a final thickness; thereafter subjecting the steel sheet to primary recrystallization annealing; thereafter applying an annealing separator to the steel sheet and then subjecting the steel sheet to final annealing; and thereafter removing the annealing separator, applying an insulating coating to the steel sheet, and subjecting the steel sheet to flattening annealing, wherein when the annealing separator containing, in a concentration C in mass %, an additive having a solubility in water of 3 g/L or less, a volume fraction R in vol % of particles whose sizes are greater than or equal to four times a cumulative 50% particle size D in μm, and a particle size standard deviation Sd in μm is applied in an application quantity A in g/m², the cumulative 50% particle size D, the volume fraction R, the particle size standard deviation Sd, the concentration C, and the application quantity A satisfy the following expressions:

$$D \geq 1.8,$$

$$Sd \leq 0.6 \cdot D, \text{ and}$$

$$0.15 \leq (A \cdot C \cdot R)/D^3 \leq 20.$$

3. The production method according to 2, wherein MgO is used as a main agent in the annealing separator.

4. The production method according to 2, wherein a non-reactive oxide is used as a main agent in the annealing separator, and an oxygen coating amount on a surface of the steel sheet after the final annealing is limited to 0.1 g/m² or less.

5. The production method according to 3, wherein 1 mass % to 20 mass % of halogen is contained in the annealing separator, and the oxygen coating amount on the surface of the steel sheet after the final annealing is limited to 0.1 g/m² or less.

6. The production method according to any one of 2 to 5, wherein an average roughness Sa of a surface of the steel sheet is adjusted to 0.3 μm or less and a maximum valley depth Sv of the surface of the steel sheet is adjusted to 2 μm or more and 5 μm or less, at any stage after final cold rolling for obtaining the final thickness and before the final annealing.

7. The production method according to any one of 2 to 6, wherein the final annealing includes a treatment of holding the steel sheet at 800° C. to 950° C. for 20 hr to 100 hr.

Advantageous Effect

It is thus possible to easily produce a grain-oriented electrical steel sheet having favorable magnetic properties and film adhesion. This significantly contributes to improved productivity and quality of steel sheets.

BRIEF DESCRIPTION OF THE DRAWINGS

In the accompanying drawings.

DETAILED DESCRIPTION

Figure 1:
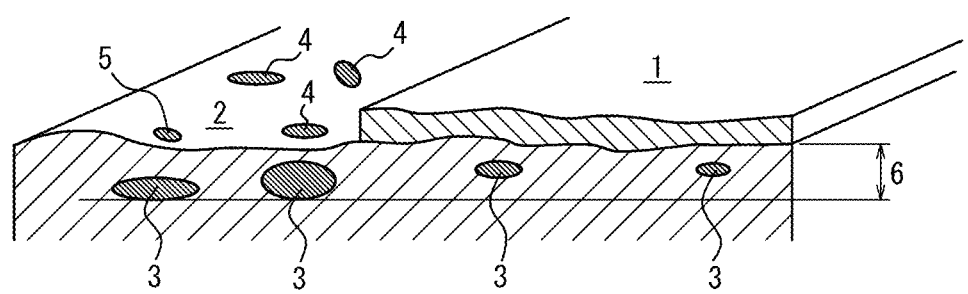
FIG. 1 is a schematic diagram of a surface layer of a grain-oriented electrical steel sheet.

As a result of conducting various experiments to further improve the film properties of grain-oriented electrical steel sheets, we discovered that a surface layer of a grain-oriented electrical steel sheet after final annealing is in a state in which a film 1 is formed on a steel substrate 2 and also partially enters into the steel substrate 2 and forms anchor parts 3, as illustrated in FIG. 1. We also discovered that, when peeling the film 1 from the steel substrate 2 of the steel sheet in a bend test, remaining parts (referred to as "neck parts" in the present disclosure) 4 and 5 of the film exposed at the surface of the steel substrate 2 are formed. In the drawing, the neck parts 4 are coarse neck parts, and the neck part 5 is a fine neck part.

In the present disclosure, the film formed on the surface of the steel substrate is referred to as "insulating film" (or simply "film"), and defined as a film directly adhering to the steel substrate. Such a film may be a forsterite film, or a film formed by insulating coating. Optionally, a film having insulating function may be further formed on the surface of the insulating film. Such a film formed on the surface of the insulating film and not in direct contact with the surface of the steel substrate need not satisfy the requirements according to the present disclosure.

We further discovered the following points: the number distribution of the coarse neck parts 4 from among the neck parts significantly contributes to better film adhesion; the fine neck parts 5 do not contribute to better film adhesion but is a major cause of degrading the hysteresis loss; and the depth 6 of the anchor parts 3 from the surface of the steel substrate 2 is not very important for the film adhesion and the depth 6 of the anchor parts 3 is preferably shallower from the viewpoint of the magnetic properties.

In the present disclosure, the depth 6 of the anchor parts 3 from the surface of the steel substrate 2 (also referred to as "anchor part depth" or "anchor depth") is defined as follows: When a film cross-section is observed throughout a region of 200 μm in length using an electron microscope with 2000 magnification, the clearance for a part (anchor part) where the deepest portion of the anchor part and the film-steel substrate interface position directly above it are farthest from each other in the region is taken to be the depth 6. Herein, the film cross-section is desirably produced by, using a thin CU film as a spacer, embedding it into a resin mold so that its cross-section will be at the surface and performing diamond polishing.

In the present disclosure, a neck part is defined as follows: When observing the surface as a result of peeling the film 1 from the steel substrate 2 in a bend test using a reflected electron image obtained with an electron microscope, a part of the film with an area of 0.1 $\mu m^2$ or more remaining on the observation plane (the surface of the steel substrate 2) is taken to be the neck part. This is because, of the remaining parts of the film, any remaining part of the film less than 0.1 $\mu m^2$ in area has little influence in the present disclosure. A coarse neck part is defined as a remaining part of the film with an area of 10 $\mu m^2$ to 40 $\mu m^2$ on the surface of the steel substrate. A fine neck part is defined as a remaining part of the film with an area of 5 $\mu m^2$ or less on the surface of the steel substrate.

In the present disclosure, a bend test is a test in which a steel sheet is wound around each of various round bars having different diameters and film peeling is visually observed, as in a typical bend adhesion test (for example, see PTL 1, PTL 2, PTL 4, etc.). In the experiments, a sample having a film remaining part largest in diameter from among samples in which the film peeled was used for observation of neck parts.

When measuring the area of each neck part after the bend test, the peeling part was sheared for surface observation using a SEM and photographed with 2000 magnification at an accelerating voltage of 5 kV, and the area was measured in the photograph using an image analyzer (image analysis software "A image kun" produced by Asahi Kasei Engineering Co.).

Experiments that led to the discovery of the presently disclosed technique will be described below.

An electrical steel slab containing C: 0.04 mass % (hereafter "mass %" with regard to components of steel sheets is simply denoted by "%"), Si: 3.3%, Al: 0.008%, N: 0.003%, Mn: 0.08%, and Sb: 0.02% with the balance consisting of Fe and inevitable impurities was heated at 1300° C. for 30 min, then hot rolled to a thickness of 2.2 mm, and then cold rolled with intermediate annealing at 1050° C. for 1 min being performed in between, to obtain a steel sheet with a final thickness of 0.23 mm. After this, the steel sheet with the final thickness was subjected to decarburization annealing, and then an annealing separator mainly composed of MgO to which an additive (strontium sulfate) was added under each of various conditions shown in Table 1 was applied to the steel sheet under each of various conditions shown in Table 1. The steel sheet was subsequently held at 820° C. for 50 hr as final annealing, and then subjected to purification annealing of holding at 1200° C. for 5 hr. Regarding the conditions shown in Table 1, A is the application quantity (g/m$^2$) of the annealing separator, C is the concentration (mass %) of the additive, R is the volume fraction (vol %) of coarse particles in the additive, D is the average particle size of the additive (cumulative 50% particle size: $\mu m$), and Sd is the particle size standard deviation ($\mu$) of the additive.

Figure 2A:
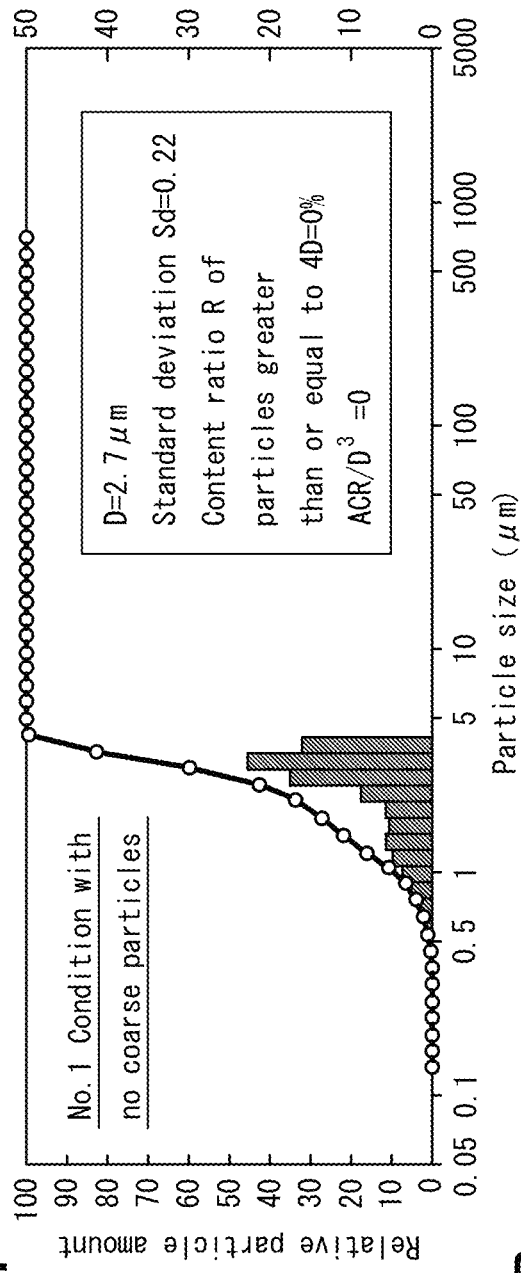
FIG. 2A is a diagram illustrating a particle size distribution of an additive.
Figure 2B:
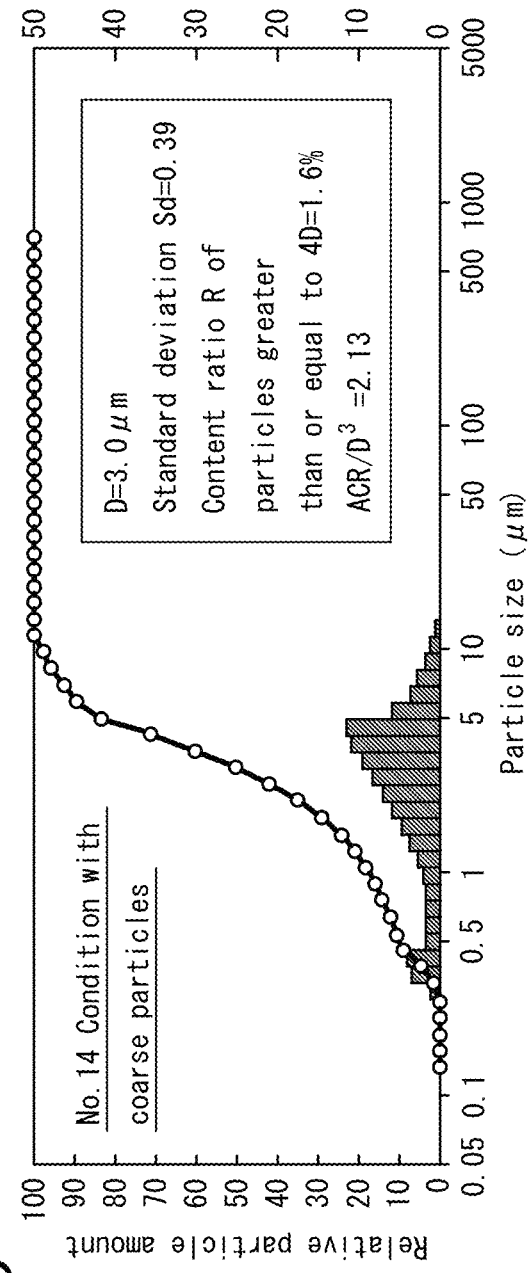
FIG. 2B is a diagram illustrating a particle size distribution of an additive.

The particle size distribution of the additive in Table 1 was measured using SALD-3100 produced by Shimadzu Corporation. In the measurement, using a 0.2 mass % hexametaphosphoric acid aqueous solution as a dispersion medium, dispersion was performed at an output of 300 W for 3 min using an ultrasonic homogenizer. FIGS. 2A and 2B respectively illustrate the measurement results of No. 1 (condition in which the additive has no coarse particles) and No. 14 (condition in which the additive has coarse particles) in Table 1 as typical examples.

For the obtained steel sheet after the purification annealing, cross-sectional observation of its film was performed using an electron microscope. Further, an insulating coating was applied to the steel sheet after the purification annealing, and the steel sheet was baked and subjected to stress relief annealing. After this, the magnetic properties were measured and the bend adhesion was examined. In the measurement of the magnetic properties, a method defined in JIS-C2550 was used.

Figure 3A:
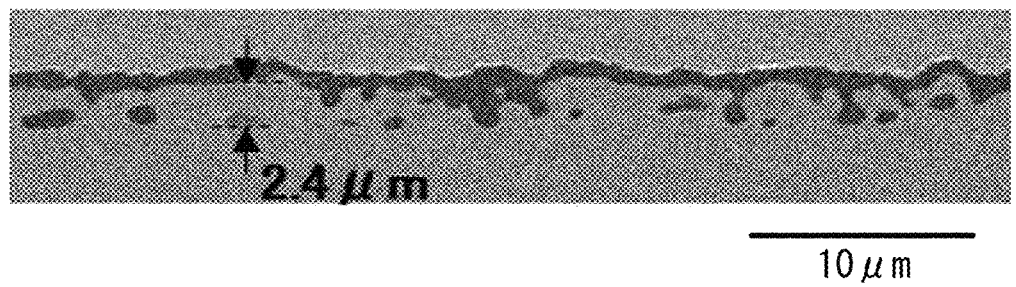
FIG. 3A is a diagram illustrating a SEM image of a film cross-section after peeling a film in a bend test when changing the particle size distribution of the additive.
Figure 3B:
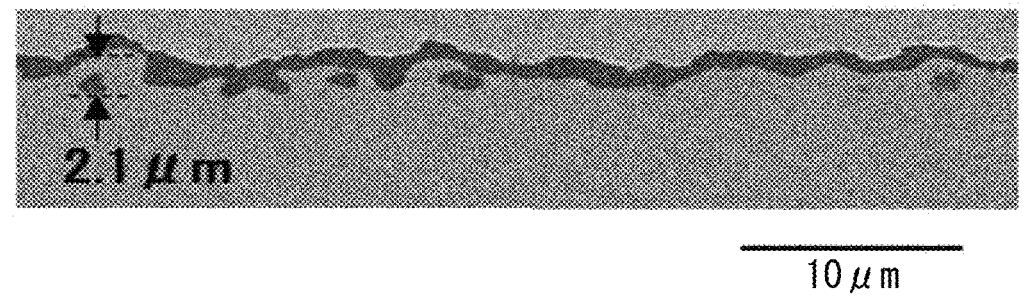
FIG. 3B is a diagram illustrating a SEM image of a film cross-section after peeling the film in the bend test when changing the particle size distribution of the additive.

In the cross-sectional observation of the film, a region of 200 $\mu m$ in length was observed using an electron microscope with 2000 magnification, the clearance for a part where the deepest portion of the anchor part and the film-steel substrate interface position directly above it were farthest from each other in the region was defined as the anchor part depth, and the distance was measured. FIGS. 3A and 3B respectively illustrate the observation planes of No. 1 and No. 14 in Table 1 as typical examples.

Figure 4A:
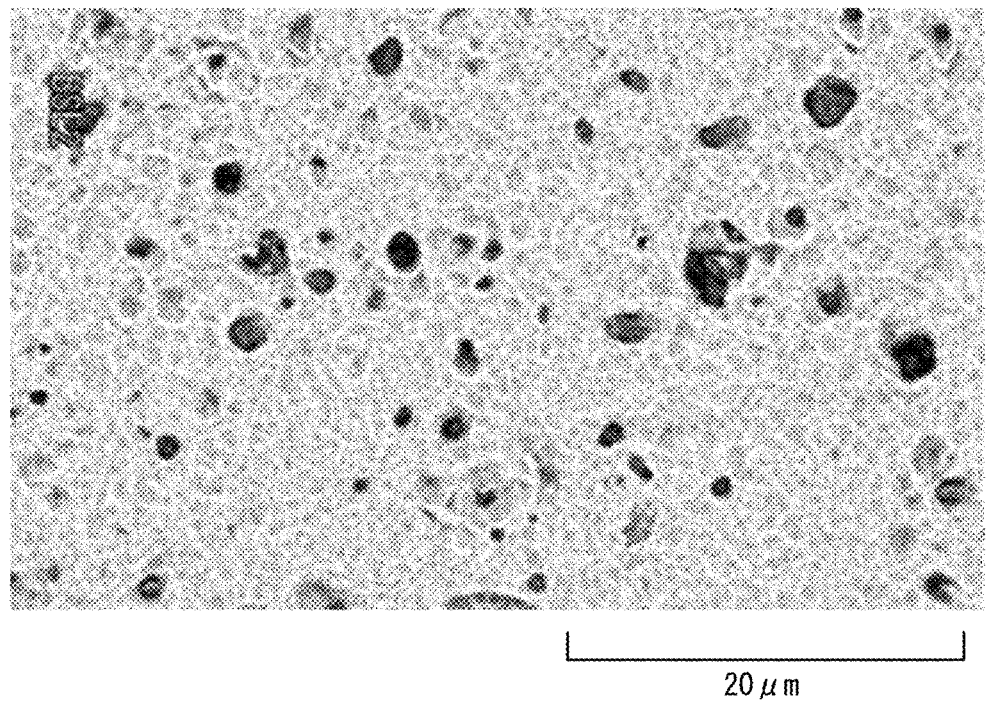
FIG. 4A is a diagram illustrating a SEM image of a steel sheet surface after peeling the film in the bend test when changing the particle size distribution of the additive.
Figure 4B:
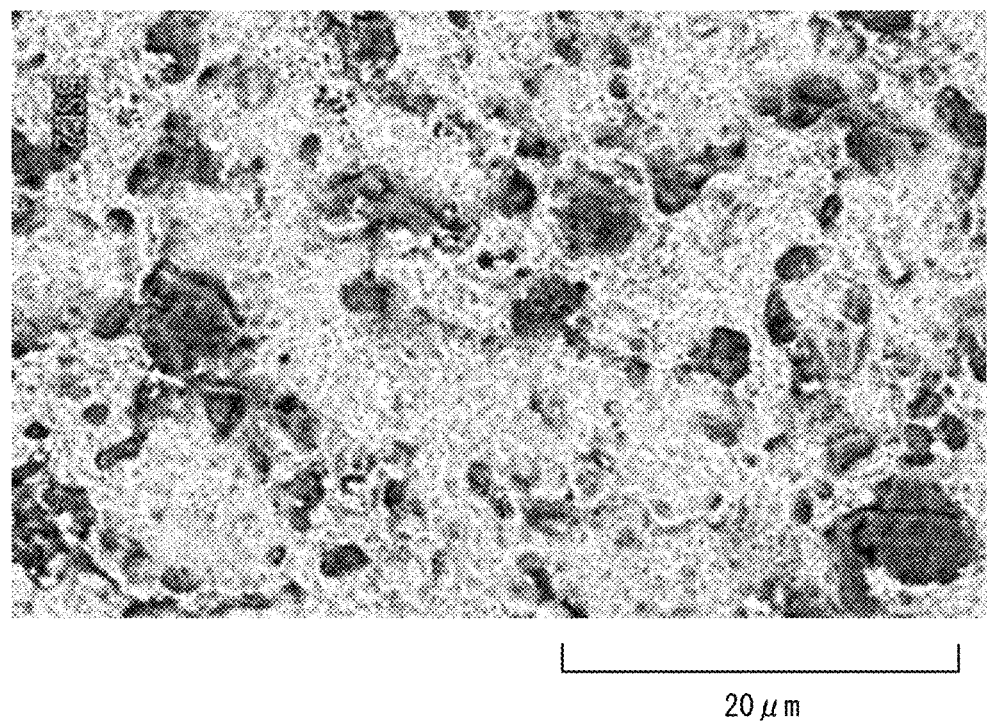
FIG. 4B is a diagram illustrating a SEM image of a steel sheet surface after peeling the film in the bend test when changing the particle size distribution of the additive.

The bend adhesion was evaluated based on the minimum bending diameter (mm) at which the film did not peel when the steel sheet was wound around a cylinder, as mentioned above. Further, a reflected electron image of a part where the film peeled in the bend test was taken from the surface of the steel substrate using an electron microscope, and image analysis was performed to determine the area of each neck part. FIGS. 4A and 4B illustrate the respective images used for the image analysis. The magnification was 2000, and the total analysis area was 10000 $\mu m^2$. The method of measuring the area of each neck part is as described above.

The evaluation results of the magnetic properties and the film adhesion are shown in Table 1.

Figure 5A:
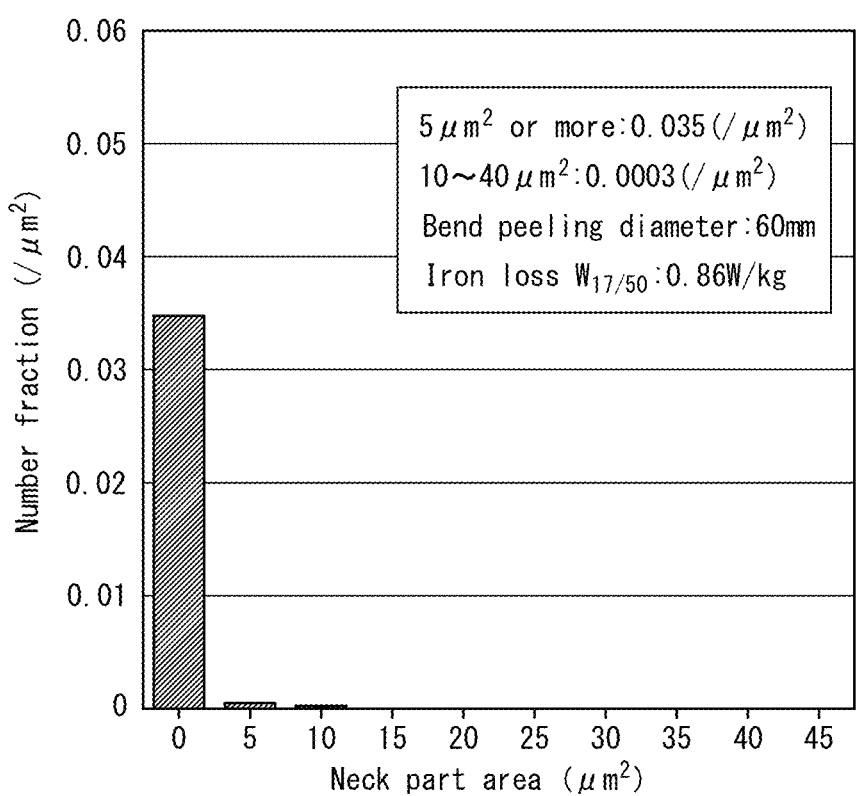
FIG. 5A is a diagram illustrating an area ratio histogram of neck parts.
Figure 5B:
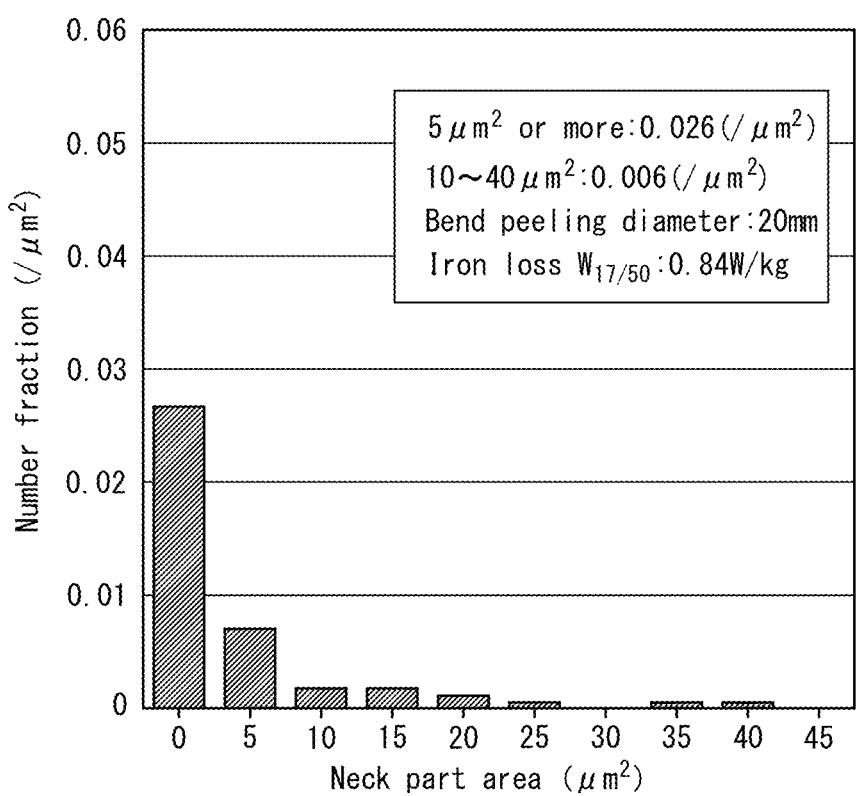
FIG. 5B is a diagram illustrating an area ratio histogram of neck parts.

FIGS. 5A and 5B respectively illustrate the histogram of the area ratio of the neck parts in the case where strontium sulfate with few coarse particles was used (condition No. 1 in Table 1) and the histogram of the area ratio of the neck parts in the case where strontium sulfate with many coarse particles was used (condition No. 14 in Table 1) as typical examples in Table 1. FIGS. 3A, 4A, and 5A illustrate the experiment results of condition No. 1 in Table 1, and FIGS. 3B, 4B, and 5B illustrate the experiment results of condition No. 14 in Table 1.

TABLE 1

| | Annealing separator | | | | | | | Anchor part | | | Evaluation | |
|---|---|---|---|---|---|---|---|---|---|---|---|---|
| No. | Application quantity A (g/m$^2$) | Concentration C (mass %) | Volume fraction R (vol %) | Cumulative 50% particle size D ($\mu m$) | Particle size standard deviation Sd ($\mu m$) | Sd/D | ACR/D$^3$ | Number of neck parts of 5 $\mu m^2$ or less (/$\mu m^2$) | Number of neck parts of 10-40 $\mu m^2$ (/$\mu m^2$) | Anchor depth ($\mu m$) | Iron loss W$_{17/50}$ (W/kg) | Bend adhesion peeling diameter (mm) |
| 1 | 9 | 3 | 0 | 2.7 | 0.22 | 0.08 | 0 | 0.035 | 0.0003 | 2.4 | 0.86 | 60 |
| 2 | 9 | 3 | 0.04 | 2.1 | 0.19 | 0.09 | 0.12 | 0.030 | 0.0040 | 2.2 | 0.86 | 40 |
| 3 | 9 | 3 | 0.1 | 5.1 | 0.23 | 0.05 | 0.02 | 0.042 | 0.0010 | 2.8 | 0.87 | 50 |

TABLE 1-continued

|  | Annealing separator | | | | | | | Anchor part | | | Evaluation | |
| --- | --- | --- | --- | --- | --- | --- | --- | --- | --- | --- | --- | --- |
| No. | Application quantity A (g/m$^2$) | Concentration C (mass %) | Volume fraction R (vol %) | Cumulative 50% particle size D (μm) | Particle size standard deviation Sd (μm) | Sd/D | ACR/D$^3$ | Number of neck parts of 5 μm$^2$ or less (/μm$^2$) | Number of neck parts of 10-40 μm$^2$ (/μm$^2$) | Anchor depth (μm) | Iron loss $W_{17/50}$ (W/kg) | Bend adhesion peeling diameter (mm) |
| 4 | 9 | 3 | 0.2 | 1.5 | 0.32 | 0.21 | 1.60 | 0.032 | 0.0030 | 2.4 | 0.86 | 40 |
| 5 | 9 | 3 | 0.5 | 2.8 | 1.78 | 0.64 | 0.61 | 0.072 | 0.0070 | 2.5 | 0.88 | 30 |
| 6 | 9 | 3 | 1.6 | 3.0 | 0.39 | 0.13 | 1.60 | 0.033 | 0.0080 | 2.8 | 0.85 | 20 |
| 7 | 9 | 3 | 4.1 | 1.8 | 0.30 | 0.17 | 18.98 | 0.044 | 0.0080 | 3.5 | 0.85 | 20 |
| 9 | 12 | 3 | 0 | 1.6 | 0.38 | 0.24 | 0 | 0.022 | 0.0004 | 2.2 | 0.85 | 50 |
| 10 | 12 | 3 | 0.04 | 2.1 | 0.19 | 0.09 | 0.16 | 0.029 | 0.0060 | 2.6 | 0.85 | 20 |
| 11 | 12 | 3 | 0.1 | 5.1 | 0.23 | 0.05 | 0.03 | 0.031 | 0.0010 | 2.4 | 0.86 | 50 |
| 12 | 12 | 3 | 0.2 | 1.5 | 0.32 | 0.21 | 2.13 | 0.026 | 0.0030 | 2.4 | 0.86 | 40 |
| 13 | 12 | 3 | 0.5 | 2.8 | 1.78 | 0.64 | 0.82 | 0.078 | 0.0070 | 2.6 | 0.89 | 30 |
| 14 | 12 | 3 | 1.6 | 3.0 | 0.39 | 0.13 | 2.13 | 0.026 | 0.0060 | 2.1 | 0.84 | 20 |
| 15 | 12 | 3 | 4.1 | 1.8 | 0.30 | 0.17 | 25.31 | 0.020 | 0.0090 | 3.9 | 0.89 | 30 |
| 17 | 12 | 5 | 0 | 1.6 | 0.38 | 0.24 | 0 | 0.033 | 0.0002 | 2.2 | 0.85 | 60 |
| 18 | 12 | 5 | 0.04 | 2.1 | 0.19 | 0.09 | 0.26 | 0.036 | 0.0070 | 2.3 | 0.85 | 20 |
| 19 | 12 | 5 | 0.1 | 5.1 | 0.23 | 0.05 | 0.05 | 0.028 | 0.0020 | 2.6 | 0.85 | 50 |
| 20 | 12 | 5 | 0.2 | 1.5 | 0.32 | 0.21 | 3.56 | 0.022 | 0.0030 | 2.4 | 0.85 | 40 |
| 21 | 12 | 5 | 0.5 | 2.8 | 1.78 | 0.64 | 1.37 | 0.080 | 0.0060 | 2.4 | 0.89 | 30 |
| 22 | 12 | 5 | 1.6 | 3.0 | 0.39 | 0.13 | 3.56 | 0.031 | 0.0080 | 2.9 | 0.84 | 20 |
| 23 | 12 | 5 | 4.1 | 1.8 | 0.30 | 0.17 | 42.18 | 0.032 | 0.0120 | 5.1 | 0.91 | 30 |
| 24 | 12 | 5 | 4.1 | 2.8 | 1.78 | 0.64 | 11.20 | 0.062 | 0.0092 | 2.3 | 0.90 | 30 |
| 25 | 12 | 3 | 0 | 3 | 1.79 | 0.59 | 0 | 0.053 | 0.0044 | 2.9 | 0.85 | 40 |

As can be understood from FIGS. 5A and 5B, while the sample using strontium sulfate with many coarse particles had many large neck parts, the sample using strontium sulfate with few coarse particles mainly had small neck parts and did not have many large neck parts. Moreover, the film adhesion was better in the sample using strontium sulfate with many coarse particles. As can be understood from Table 1, there was tendency of iron loss degradation in each condition with many small neck parts of 5 μm$^2$ or less and in each condition with deep anchor part depth, and film degradation occurred in each condition with small average particle size D and in each condition with few large neck parts.

Although the reason why the film adhesion of the steel sheet varies depending on the area ratio of large neck parts is not clear, we consider the reason as follows:

Film peeling occurs as a result of, when bending stress is exerted on the steel sheet, the anchor parts being subjected to shear stress and destructed at the steel substrate-film interface due to the difference between the Young's modulus of the steel sheet and the Young's modulus of the film. As can be seen from the photograph in FIG. 4B, large neck parts remain under the condition of favorable film adhesion. As can be seen from the photograph in FIG. 4A, the existence frequency of large neck parts is lower under the condition of poor film adhesion. This suggests that large neck parts are closely related to the film adhesion while small neck parts do not necessarily influence the film adhesion. From the viewpoint of the magnetic properties, too, if there is roughness, domain wall displacement is hindered and the hysteresis loss (Wh) increases. Therefore, anchor parts that hardly influence the adhesion need to be reduced as much as possible. Moreover, at the time of film peeling, anchor parts are destructed at neck parts and separated from the film at the neck parts and remain existing inside the steel sheet. Accordingly, with the minimum depth with which the neck parts are destructed without involving the anchor parts in the peeling, the film adhesion is substantially unaffected even if the anchor parts do not exist deeper inside the steel substrate. In view of this, the anchor part depth is desirably as shallow as possible considering the influence on the hysteresis loss.

Specifically, in this experiment, the particle size of strontium sulfate as the additive was significant in achieving the foregoing form of anchor parts. The reason for this is considered as follows:

Typically, since the formation of the forsterite film is a solid phase reaction, the formation of the film tends to be influenced by the particle size of the additive in the reaction aid. Thus, the reactivity with the steel sheet decreases if the particle size of the additive is large, and the reactivity with the steel sheet increases if the particle size of the additive is small. In detail, with a powder of uniform particle size, a film is uniformly formed so as to be flat. With an additive moderately containing coarse particles with respect to the average particle size, on the other hand, the film formation rate differs depending on the part of contact with the steel sheet, so that the interface between the steel sheet and the film becomes rough. This roughness leads to the formation of anchor parts.

In view of such reason, by making the particle size distribution uniform as a whole while allowing moderate existence of coarse particles, anchor parts that are large to a certain extent can be increased while reducing fine anchor parts. However, given that the film formation rate depends on the relative particle size of the additive, it is impossible to represent the film formation rate using an absolute value of the particle size.

We accordingly analyzed the foregoing experiment in detail. As a result, we discovered that particles whose particle sizes are greater than or equal to four times the average particle size of the additive strongly influence the formation of coarse anchor parts as coarse particles. We also discovered that, to allow the existence of such particles, it is important to establish a specific relationship between the application quantity A of the annealing separator and the concentration C of the additive, the average particle size D of the additive, and the volume fraction (hereafter also referred to as "content ratio") R of the coarse particles.

In detail, the value of $(A \cdot C \cdot R)/D^3$ (hereafter simply denoted by $ACR/D^3$) calculated using A, C, D, and R represents the existence frequency of coarse particle additive per unit area of the surface of the steel sheet. When this value increases, the existence frequency of coarse particles at the surface of the steel sheet increases, and the number of coarse anchor parts increases and the number of fine anchor parts decreases. Here, if the existence frequency of coarse particles is excessively high, the anchor part depth is excessively deep, which causes an increase in hysteresis loss. It is therefore important to adjust the application quantity of the annealing separator and the concentration of the additive according to the existence frequency of coarse particles, to appropriately adjust the amount of coarse particles introduced at the surface. Through such treatment, a film that combines the magnetic properties and the film adhesion can be obtained.

Such changes in film formation rate are limited to additives having relatively large average particle sizes. In the case of a fine additive, even if the additive contains coarse particles, fine particles enter the gaps between coarse particles and undergo reaction in the initial stage of annealing. Hence, the reaction rate in film formation is unlikely to change.

The reasons for the limitations according to the present disclosure will be described below.

An insulating film according to the present disclosure forms an anchor part that results from the film partially entering into a steel substrate and a neck part that connects the anchor part and an upper portion of the film, wherein when peeling the film from the steel substrate in a bend test for the steel sheet, the number of neck parts of 5 $\mu m^2$ or less in area remaining on the surface of the steel substrate is 0.06/$\mu m^2$ or less. If the number of neck parts of 5 $\mu m^2$ or less in area is more than 0.06, the hysteresis loss increases and the iron loss degrades. The number of neck parts of 5 $\mu m^2$ or less in area is preferably 0.05/$\mu m^2$ or less. Although no lower limit is placed on the neck part area, the lower limit is preferably about 0.01 $\mu m^2$ from the viewpoint of the measurement accuracy. Since a smaller number of neck parts of 5 $\mu m^2$ or less in area contributes to lower iron loss, the number of neck parts of 5 $\mu m^2$ or less in area may be 0/$\mu m^2$.

The number of neck parts of 10 $\mu m^2$ to 40 $\mu m^2$ in area is 0.005/$\mu m^2$ or more and 0.011/$\mu m^2$ or less. In detail, the number of neck parts of 10 $\mu m^2$ to 40 $\mu m^2$ in area needs to be 0.005/$\mu m^2$ or more, in order to ensure the film adhesion. Meanwhile, if the roughness is excessive, the hysteresis loss increases. Accordingly, the number of neck parts of 10 $\mu m^2$ to 40 $\mu m^2$ in area is 0.011/$\mu m^2$ or less. The number of neck parts of 10 $\mu m^2$ to 40 $\mu m^2$ in area is preferably 0.006/$\mu m^2$ or more. The number of neck parts of 10 $\mu m^2$ to 40 $\mu m^2$ in area is preferably 0.009/$\mu m^2$ or less. Here, any neck part of more than 40 $\mu m^2$ in area differs in shape from so-called an anchor, which is connected to the upper portion of the film by a neck part, and thus is regarded as a thick film part where the upper portion and lower portion of the film are integrated. Such a neck part is therefore not counted in the number measurement in the present disclosure.

Moreover, the depth of anchor parts from the surface of the steel substrate is 3.5 $\mu m$ or less. If the depth of anchor parts from the surface of the steel substrate is more than 3.5 $\mu m$, the hysteresis loss increases and the iron loss degrades. The depth of anchor parts from the surface of the steel substrate is preferably 3.0 $\mu m$ or less. Although no lower limit is placed on the depth, the lower limit is preferably about 0.1 $\mu m$ from the viewpoint of the measurement accuracy.

A preferred range of the chemical composition of steel that is raw material according to the present disclosure is as follows:

C: 0.01% to 0.10%

If the C content is less than 0.01%, the grain boundary strengthening effect of C cannot be achieved, and defects that hinder the production, such as slab cracking, occur. If the C content is more than 0.10%, it is difficult to reduce C to 0.004% or less, i.e. a range in which magnetic aging will not occur, by decarburization annealing. Therefore, the C content is preferably in a range of 0.01% to 0.10%. The C content is more preferably 0.02% or more. The C content is more preferably 0.08% or less.

Si: 2% to 4%

Si is an element necessary for enhancing the specific resistance of the steel and reducing the iron loss. If the Si content is less than 2%, the effect is insufficient. If the Si content is more than 4%, the workability decreases and the production by rolling is difficult. Therefore, the Si content is preferably in a range of 2% to 4%. The Si content is more preferably 2.8% or more. The Si content is more preferably 3.7% or less.

Mn: 0.01% to 0.5%

Mn is an element necessary for improving the hot workability of the steel. If the Mn content is less than 0.01%, the effect is insufficient. If the Mn content is more than 0.5%, the magnetic flux density of the product sheet decreases. Therefore, the Mn content is preferably in a range of 0.01% to 0.5%. The Mn content is more preferably 0.02% or more. The Mn content is more preferably 0.20% or less.

Components other than those described above differ between the case of using an inhibitor in order to cause secondary recrystallization and the case of not using an inhibitor in order to cause secondary recrystallization.

In the case of using an inhibitor in order to cause secondary recrystallization, for example when using an AlN-based inhibitor, it is preferable to contain Al and N in a range of Al: 0.01% to 0.04% and in a range of N: 0.003% to 0.015%, respectively. When using a MnS—MnSe-based inhibitor, it is preferable to contain Mn in the foregoing amount and one or two selected from the group consisting of S: 0.002% to 0.03% and Se: 0.003% to 0.03%. If the addition amount of each element is less than the lower limit, the inhibitor effect is insufficient. If the addition amount of each element is more than the upper limit, the inhibitor component remains not dissolved during slab heating, which causes a decrease in magnetic properties. The AlN-based inhibitor and the MnS—MnSe-based inhibitor may be used together.

In the case of not using an inhibitor in order to cause secondary recrystallization, it is preferable to reduce the contents of the foregoing inhibitor forming components, i.e. Al, N, S, and Se, as much as possible and use a steel material containing Al: less than 0.01%, N: less than 0.005%, S: less than 0.005%, and Se: less than 0.005%.

The grain-oriented electrical steel sheet according to the present disclosure may contain, besides the foregoing components, one or more selected from the group consisting of Ni: 0.001% to 0.15%, Sb: 0.005% to 0.50%, Sn: 0.005% to 0.20%, P: 0.01% to 0.08%, Bi: 0.005% to 0.05%, Mo: 0.005% to 0.10%, B: 0.0002% to 0.0025%, Cu: 0.01% to 0.2%, Te: 0.0005% to 0.010%, Cr: 0.01% to 0.2%, Nb: 0.0010% to 0.010%, V: 0.001% to 0.010%, Ti: 0.001% to 0.010%, and Ta: 0.001% to 0.010% as appropriate, in order to improve the magnetic properties.

The steel sheet according to the present disclosure may be produced by obtaining steel having the foregoing chemical composition by steelmaking using a conventional refining process and then either subjecting the steel to conventionally known ingot casting and blooming or continuous casting to produce a steel material (slab) or subjecting the steel to direct casting to produce a thin slab or thinner cast steel of 100 mm or less in thickness. In the case of producing the slab, the steel is, for example, heated to about 1400° C. in the case of containing an inhibitor component or heated to 1300° C. or less in the case of not containing an inhibitor component and then subjected to hot rolling, according to a conventional method. In the case where the steel does not contain an inhibitor component, the steel may be hot rolled immediately after casting, without heating. In the case of producing the thin slab or thinner cast steel, the steel may be hot rolled, or directly subjected to the subsequent process without hot rolling.

A hot-rolled sheet obtained as a result of hot rolling is optionally subjected to hot-rolled sheet annealing. The annealing temperature in the hot-rolled sheet annealing is preferably in a range of 800° C. to 1150° C., in order to achieve favorable magnetic properties. If the annealing temperature is less than 800° C., the band texture formed in the hot rolling remains, which makes it difficult to obtain primary recrystallized texture of uniformly-sized grains. Thus, the development of secondary recrystallization is hindered. If the annealing temperature is more than 1150° C., the particle size after the hot-rolled sheet annealing is excessively coarse, which makes it difficult to obtain primary recrystallized texture of uniformly-sized grains.

The hot-rolled sheet after the hot rolling or after the hot-rolled sheet annealing is subjected to cold rolling once, or twice or more with intermediate annealing therebetween, to obtain a cold-rolled sheet with a final thickness. The annealing temperature in the intermediate annealing is preferably in a range of 900° C. to 1200° C. If the annealing temperature is less than 900° C., the recrystallized grains after the intermediate annealing are fine. Further, there is tendency that Goss nuclei in the primary recrystallized texture decrease and the magnetic properties of the product sheet decrease. If the annealing temperature is more than 1200° C., crystal grains are excessively coarsened as in the hot-rolled sheet annealing, which makes it difficult to obtain primary recrystallized texture of uniformly-sized grains.

In the cold rolling that yields the final thickness (hereafter referred to as "final cold rolling"), the temperature of the steel sheet may be increased to 100° C. to 300° C. to perform the final cold rolling, and aging treatment may be performed at least once at a temperature of 100° C. to 300° C. during the final cold rolling. This improves the primary recrystallized texture, and thus further improves the magnetic properties.

After the final cold rolling, the steel sheet is subjected to primary recrystallization annealing, an annealing separator is applied to the steel sheet, and then the steel sheet is subjected to final annealing. These processes are strictly controlled in order to form a favorable film in the present disclosure.

The heating rate in the primary recrystallization annealing is not limited, but the heating rate from 500° C. to 700° C. is desirably 50° C./s or more because the secondary recrystallized grains are refined and the iron loss is improved. The soaking time is 80 sec or more and 200 sec or less. The soaking time is more preferably 90 sec or more. The soaking time is more preferably 150 sec or less. If the soaking time is less than 80 sec, there is possibility that the decarburization is insufficient or the growth of primary grains is insufficient. If the soaking time is more than 200 sec, there is possibility that the growth of primary grains is excessive. In the present disclosure, the steel sheet may be retention annealed in the final annealing.

After the primary recrystallization annealing, the annealing separator is applied to the steel sheet. In the case where MgO is used as a main agent of the annealing separator (i.e. the annealing separator is mainly composed of MgO), it is effective to limit the amount of moisture introduced as a result of slurrying to 1.0 mass % or more and 3.9 mass % or less. This is intended to control the reactivity of MgO and also adjust the amount of moisture introduced into the atmosphere in the final annealing. If the amount of moisture introduced is outside this range, a base film of a desired shape may be unable to be formed. Herein, the main agent in the annealing separator denotes a component contained at a ratio of 50 vol % or more to the whole annealing separator. In the present disclosure, the main agent in the annealing separator is MgO or the below-described non-reactive oxide.

In the present disclosure, the annealing separator containing, in a concentration C (mass %), an additive having a solubility in water of 3 g/L or less, a volume fraction R (vol %) of particles whose sizes are greater than or equal to four times the cumulative 50% particle size D (μm), and a particle size standard deviation Sd (μm) is applied to the steel sheet in an application quantity A (g/m$^2$). Here, it is important that the cumulative 50% particle size D, the volume fraction R, the particle size standard deviation Sd, the concentration C, and the application quantity A satisfy the following expressions:

$$D \geq 1.8,$$

$$Sd \leq 0.6 \cdot D, \text{ and}$$

$$0.15 \leq (A \cdot C \cdot R)/D^3 \leq 20.$$

In detail, if the additive is a powder in which D is less than 1.8 μm, even when coarse particles exist, the fine powder is dispersedly applied around the coarse particles, so that the foregoing difference in film formation cannot be obtained and the desired anchor shape cannot be achieved. The cumulative 50% particle size D in the additive is therefore 1.8 μm or more, and preferably 2.1 μm or more.

If the value of $ACR/D^3$ is less than 0.15, the formation of neck parts having certain sizes is insufficient. If the value of $ACR/D^3$ is more than 20, the formation of such neck parts is excessively promoted, and the hysteresis loss increases. The value of $ACR/D^3$ is therefore limited to this range. The value of $ACR/D^3$ is preferably 0.25 or more. The value of $ACR/D^3$ is preferably 20 or less.

The particle size standard deviation of the additive is 0.6 D or less. If the particle size standard deviation is more than 0.6 D, the distribution is excessively wide, so that fine neck parts increase and the hysteresis loss increases. The particle size standard deviation is preferably 0.25 D or less.

Although no lower limit is placed on D, the lower limit is about 0.2 μm industrially.

Examples of the additive of the annealing separator include oxides, hydroxides, sulfates, phosphates, borates, silicates, and carbonates of Mg, Ca, Ti, Cr, Mn, Fe, Cu, Sr, V, Co, Zn, Sn, Sb, Ba, Bi, and Mo. In addition, for example, a water-soluble compound or a fine additive of less than 1.8 μm in average particle size may be added in combination.

In the case where the insulating film is a forsterite film, MgO is used in the annealing separator. By using the annealing separator containing MgO as a main agent and an additive satisfying the foregoing conditions, the insulating film of the film structure described above can be formed on the steel sheet.

In the case of not forming a forsterite film, i.e. in the case of applying filmless mirror finishing, an annealing separator containing a non-reactive oxide such as $Al_2O_3$ or $MgAl_2O_4$ as a main agent instead of MgO may be used. Alternatively, an annealing separator containing MgO as a main agent and 1 mass % to 20 mass % of halogen as an auxiliary agent may be used. When such annealing separators are used, the oxygen coating amount on the surface of the steel sheet after the final annealing is 0.1 $g/m^2$ or less, and an oxide film hardly forms. Meanwhile, in the case where the foregoing requirements for the particle size of the additive and the like in the annealing separator are satisfied, anchor parts satisfying the foregoing conditions are formed on the steel substrate side. The film portion in such an anchor part peels off the surface of the steel substrate together with the thin film covering the surface of the steel substrate after the final annealing, as a result of which the anchor part remains as a hollow on the steel substrate side. In the subsequent application of an insulating coating, the coating material enters into the hollow, which forms an anchor part integrally with the insulating film after baking and consequently exhibits the same effects as the foregoing anchor part. The adhesion of the insulating coating can thus be enhanced. Here, the insulating film formed by such coating satisfies the requirements according to the present disclosure.

Regardless of which of the foregoing annealing separators having different main agents is used, the final annealing is performed after the application of the annealing separator. In the final annealing, holding the steel sheet at 800° C. to 950° C. for 20 hr to 100 hr is effective in reducing fine anchor parts and increasing coarse anchor parts. This is because, during this retention annealing, silica in subscale concentrates at the film surface and the film-steel substrate interface to decrease surface energy, after which full film formation is induced. If the holding time is less than 20 hr, the effect is insufficient. If the holding time is more than 100 hr, coarse anchor parts develop excessively and the hysteresis loss degrades. Accordingly, this range is desirable. The holding time is more preferably 30 hr or more. The holding time is more preferably 80 hr or less.

If the soaking temperature in the final annealing is less than 800° C., there is possibility that the decarburization is insufficient or the growth of primary grains is insufficient. If the soaking temperature is more than 950° C., there is possibility that the decarburization is insufficient or the growth of primary grains is excessive. The soaking temperature is more preferably 800° C. or more. The soaking temperature is more preferably 930° C. or less.

The atmosphere in the final annealing is a wet hydrogen atmosphere, and the dew point is adjusted to limit $pH_2O/pH_2$ to 0.65 or less and more preferably 0.55 or less on average in the whole soaking. If $pH_2O/pH_2$ is more than 0.65, FeO tends to form at the surface, which may degrade the film. The atmosphere oxidizability may be controlled separately in a heating zone, a soaking zone, and a final soaking zone. Limiting $PH_2O/PH_2$ to 0.2 or less and more preferably 0.15 or less at the end of the soaking in the final annealing yields a reducing atmosphere. This is further advantageous in adjusting the form of an internal oxide film formed in the surface layer and improving the magnetic properties and the film.

There is a known method of performing nitriding treatment before, during, or after primary recrystallization annealing in order to improve the magnetic properties. Such a method may also be used in the present disclosure.

The presently disclosed technique can also be used in an iron loss improving method by filmless mirror finishing, as mentioned above. In detail, in the present disclosure, the foregoing non-reactive oxide may be used in the annealing separator to limit the oxygen coating amount on the surface after the final annealing to 0.1 $g/m^2$ or less, or MgO may be used as a main agent in the annealing separator while also adding 1 mass % to 20 mass % of halogen as an auxiliary agent to limit the oxygen coating amount on the surface after the final annealing to 0.1 $g/m^2$ or less. In this case, after the final annealing, anchor parts become hollow as there is no oxide serving as anchor parts. Then, in the subsequent insulating coating application, the coating enters into the hollows to form and function as anchor parts.

In the case of adding halide to MgO as the main agent in the annealing separator and performing mirror finishing, the filmless steel sheet surface becomes rough, where the insulating coating enters and further forms anchor parts. Typically, in a steel sheet that is sufficiently mirror finished, a binder is applied between the insulating coating and the steel sheet by a method such as PVD or CVD in order to maintain the adhesion to the insulating coating. In the case of adding halide to MgO as the main agent in the annealing separator and performing mirror finishing, however, the surface of the steel sheet has moderate roughness, so that the film adhesion is maintained even when the coating is directly formed. Moreover, as a result of the film on the surface of the steel sheet peeling and causing mirror finishing, the anchor part depth becomes shallow, so that degradation in hysteresis loss is suppressed.

An effective way of achieving the form of the film according to the present disclosure is to adjust the average roughness of the surface of the steel sheet to 0.3 μm or less and the maximum valley depth of the surface of the steel sheet to 2 μm or more and 5 μm or less at any stage from the final cold rolling to the final annealing. In detail, as a result of the average roughness being 0.3 μm or less, the number of anchor parts of 5 $μm^2$ or less can be more easily reduced to 0.06/$μm^2$ or less. As a result of the maximum valley depth being 2 μm or more and 5 μm or less, the number of coarse anchor-neck parts of 10 $μm^2$ to 40 $μm^2$ or more can be secured, and the depth of anchor parts from the surface of the steel substrate can be more easily limited to 3.5 μm or less.

It is further preferable to adjust the average roughness Sa of the surface of the steel sheet to 0.3 μm or less and the maximum valley depth Sv of the surface of the steel sheet to 2 μm or more and 5 μm or less before the decarburization annealing. The steel sheet may be retained and annealed in the final annealing. Although no lower limit is placed on Sa, the lower limit is about 0.5 μm industrially. The roughness is as defined in ISO 25178.

There are various methods for adjusting the roughness of the surface of the steel sheet. Examples of methods that may be used include a method of optimizing the roughness pattern of rolls in the final cold rolling, a method of imparting roughness to the steel sheet by causing the steel sheet to pass between rolls having appropriate roughness after the cold rolling, and a method of making the surface rough by laser machining or etching.

Regarding the other production conditions, the dew point of the atmosphere in the final annealing is preferably 20° C. or less, in order to prevent degradation by oxidation of an inhibitor. Further, in the case of using an inhibitor to cause secondary recrystallization after the final annealing, it is preferable to perform purification annealing of holding the steel sheet in a hydrogen atmosphere at about 1200° C., specifically, at a temperature of 1150° C. to 1240° C. for 2 hr to 50 hr, in order to remove the inhibitor forming component from the product sheet.

The steel sheet after the final annealing or the purification annealing is washed with water, brushed, pickled, or the like to remove the unreacted annealing separator adhering to the surface of the steel sheet. Following this, shape adjustment is preferably performed by flattening annealing, for iron loss reduction. This is intended to prevent degradation in magnetic properties caused by coil set because the final annealing is typically performed in a coil state.

In the case of using the steel sheet in a stacked state, it is preferable to apply an insulating coating to the surface of the steel sheet before, during, or after the flattening annealing. Here, the insulating coating is preferably a tension-applying film capable of applying tension to the steel sheet, for further reduction in iron loss. To form a tension-applying film having excellent film adhesion and a significant iron loss reduction effect, a method of applying a tension film via a binder or a method of applying a tension film after vapor depositing inorganic matter in the surface layer of the steel sheet by physical vapor deposition or chemical vapor deposition may be used. In the present disclosure, however, surface roughness is appropriately formed, so that sufficient adhesion can be obtained without using a binder.

In the case of filmless mirror finishing, predetermined neck parts may be adjusted by making the steel sheet rough using rolls, etching, laser machining, or the like after the final annealing and before the insulating coating application.

For further reduction in iron loss, magnetic domain refining treatment is preferably performed. Examples of suitable magnetic domain refining methods include commonly used methods such as a method of irradiating the surface of the final product sheet with thermal energy such as an electron beam, a laser beam, or plasma to introduce linear or pointlike thermal strain, a method of introducing working strain such as linear or pointlike indentations or scratches onto the surface of the final product sheet, and a method of, in an intermediate process, etching the surface of the steel sheet cold rolled to the final thickness to form linear or pointlike grooves.

EXAMPLES

Example 1

Slabs containing C: 0.06%, Si: 3.28%, Al: 0.02%, N: 80 mass ppm, Mn: 0.07%, S: 0.005%, and Cu: 0.06% with the balance consisting of Fe and inevitable impurities were each heated to 1400° C., hot rolled to 2.2 mm in thickness, and cold rolled to 0.23 mm in thickness with intermediate annealing at 1050° C. for 2 min being performed in between, thus obtaining a steel sheet with final thickness. The surface of the steel sheet was then refined by laser irradiation, to change the surface characteristics (average roughness Sa and maximum valley depth Sv) of the steel sheet. After this, the steel sheet was annealed at 800° C. for 120 sec with water vapor partial pressure $P(H_2O)/P(H_2)$: 0.4, as primary recrystallization annealing.

Further, an annealing separator was applied to the surface of the steel sheet after the primary recrystallization annealing. In detail, an annealing separator obtained by adding, to MgO having an average particle size of 1.2 μm and a particle size standard deviation of 0.4 μm, 6 mass % of $TiO_2$ having an average particle size of 0.3 μm and 2 mass % (concentration C) of MnO having an average particle size (cumulative 50% particle size) D of 2.0 μm, a content ratio R of particles whose particle sizes were greater than or equal to four times the average particle size D of 4.7 vol %, and a particle size standard deviation of 0.4 μm was applied to the steel sheet in an application quantity A of 9 g/m². Here, $ACR/D^3$ was 10.6.

Subsequently, the steel sheet was held at 900° C. for 30 hr as final annealing, and then subjected to purification annealing at 1160° C. for 10 hr. After the purification annealing, the unreacted annealing separator was removed, a magnesium phosphate-silica-based insulating coating was applied, and flattening annealing at 800° C. for 10 sec serving also as baking was performed.

The results of studying the magnetic properties and the film adhesion of each obtained steel sheet are shown in Table 2. As a result of the surface roughness being within the appropriate range, the hysteresis loss was reduced and the iron loss was improved, and favorable film adhesion was achieved.

TABLE 2

| | Surface roughness | | Anchor part | | Anchor depth (μm) | Evaluation | | |
| | | | Number of neck parts of 5 μm² or less | Number of neck parts of 10-40 μm² | | Iron loss $W_{17/50}$ | Bend adhesion peeling diameter | |
| No. | Sa | Sv | (/μm²) | (/μm²) | (μm) | (W/kg) | (mm) | Remarks |
| 1 | 0.22 | 1.8 | 0.028 | 0.006 | 2.8 | 0.84 | 30 | Example |
| 2 | 0.21 | 2.0 | 0.035 | 0.006 | 2.9 | 0.83 | 20 | Example |
| 3 | 0.23 | 3.2 | 0.032 | 0.008 | 2.8 | 0.83 | 20 | Example |
| 4 | 0.28 | 4.8 | 0.042 | 0.008 | 3.3 | 0.84 | 20 | Example |
| 5 | 0.26 | 3.6 | 0.041 | 0.008 | 3.3 | 0.84 | 20 | Example |
| 6 | 0.32 | 5.3 | 0.054 | 0.010 | 3.5 | 0.86 | 20 | Example |

Example 2

Slabs containing C: 0.03%, Si: 3.4%, Al: 0.006%, N: 30 mass ppm, Mn: 0.07%, P: 0.02%, and Mo: 0.02% with the balance consisting of Fe and inevitable impurities were each heated to 1400° C., hot rolled to 2.2 mm in thickness, and cold rolled to 0.23 mm in thickness with intermediate annealing at 1050° C. for 2 min being performed in between, thus obtaining a steel sheet with final thickness. Following this, the surface of the steel sheet was resist printed and then etched to form patterned holes on the surface of the steel sheet. Here, the average roughness Sa was 0.3 μm, and the maximum valley depth Sv was 3.9 μm. After this, the steel sheet was annealed at 860° C. for 80 sec with water vapor partial pressure $P(H_2O)/P(H_2)$: 0.5, as primary recrystallization annealing.

Further, an annealing separator was applied to the surface of the steel sheet after the primary recrystallization annealing. In detail, an annealing separator obtained by adding, to MgO having an average particle size of 0.8 μm and a particle size standard deviation of 0.3 μm, 4 mass % of $TiO_2$ having an average particle size of 0.3 μm and 4 mass % (concentration C) of talc $(Mg_3Si_4O_{10}(OH)_2)$ having an average particle size D of 6.2 μm, a content ratio R of particles whose particle sizes were greater than or equal to four times the average particle size D of 3.2 vol %, and a particle size standard deviation of 0.52 μm was applied to the steel sheet in an application quantity A of 9 g/m². Here, $ACR/D^3$ was 0.53.

Subsequently, the steel sheet was held at 850° C. for 30 hr as final annealing and then subjected to purification annealing at 1160° C. for 10 hr, or directly subjected to the purification annealing without the retention. After the purification annealing, the unreacted annealing separator was removed, a magnesium phosphate-silica-based insulating coating was applied, and flattening annealing at 800° C. for 10 sec serving also as baking was performed.

The results of studying the magnetic properties and the film adhesion of each obtained steel sheet are shown in Table 3. As a result of the optimization of the surface roughness, the introduction of coarse particles into the additive of the annealing separator, and the addition of the retention annealing, the hysteresis loss was reduced and the iron loss was improved as compared with No. 9.

TABLE 3

| | Retention condition | | Anchor part | | | | Evaluation | | |
|---|---|---|---|---|---|---|---|---|---|
| | | | Number of neck parts of | Number of neck parts of | Anchor | Iron loss | Bend adhesion peeling | | |
| No. | Temperature (° C.) | Time (h) | 5 μm² or less (/μm²) | 10-40 μm² (/μm²) | depth (μm) | $W_{17/50}$ (W/kg) | diameter (mm) | Remarks | |
| 1 | 750 | 30 | 0.043 | 0.005 | 3.3 | 0.85 | 30 | Present Example |
| 2 | 800 | 30 | 0.038 | 0.006 | 3.3 | 0.83 | 20 | Present Example |
| 3 | 850 | 30 | 0.035 | 0.008 | 3.3 | 0.83 | 20 | Present Example |
| 4 | 900 | 30 | 0.029 | 0.008 | 3.4 | 0.83 | 20 | Present Example |
| 5 | 950 | 30 | 0.028 | 0.008 | 3.4 | 0.83 | 20 | Present Example |
| 6 | 1000 | 30 | 0.026 | 0.009 | 3.5 | 0.85 | 20 | Present Example |
| 7 | 850 | 10 | 0.051 | 0.005 | 3.3 | 0.85 | 30 | Present Example |
| 8 | 850 | 150 | 0.033 | 0.009 | 3.5 | 0.85 | 20 | Present Example |
| 9 | No retention | | 0.045 | 0.005 | 3.3 | 0.86 | 30 | Present Example |

Example 3

Slabs containing C: 0.03%, Si: 3.32%, Al: 0.01%, N: 60 mass ppm, Mn: 0.07%, and Sb: 0.04% with the balance consisting of Fe and inevitable impurities were each heated to 1400° C., hot rolled to 2.2 mm in thickness, and cold rolled to 0.23 mm in thickness with intermediate annealing at 1050° C. for 2 min being performed in between, thus obtaining a steel sheet with final thickness. Here, the roughness of the rolls in the final cold rolling was adjusted to adjust the average roughness Sa of the surface of the steel sheet to 0.22 μm and the maximum valley depth Sv of the surface of the steel sheet to 3.2 μm. After this, the steel sheet was annealed at 850° C. for 90 sec with water vapor partial pressure P(H₂O)/P(H₂): 0.3, as primary recrystallization annealing.

Further, an annealing separator was applied to the surface of the steel sheet after the primary recrystallization annealing. In detail, an annealing separator obtained by adding, to MgO having an average particle size of 0.9 μm and a particle size standard deviation of 0.4 μm, 6 mass % of BiCl₃ and 1.5 mass % (concentration C) of SnO having an average particle size D of 3.6 μm, a content ratio R of particles whose particle sizes were greater than or equal to four times the average particle size D of 2.2 vol %, and a particle size standard deviation of 1.5 μm was applied to the steel sheet in an application quantity A of 9 g/m². Here, ACR/D³ was 0.7.

Subsequently, the steel sheet was held at 850° C. for 30 hr as final annealing and then subjected to purification annealing at 1160° C. for 10 hr, or directly subjected to the purification annealing without the retention. After the purification annealing, the unreacted annealing separator was removed. At this stage, no oxide film remained at the surface of the steel sheet, and hollows of about 10 μm² in size were formed on the steel substrate side from the surface of the steel sheet. A magnesium phosphate-silica-based insulating coating was applied to the steel sheet after the final annealing, and flattening annealing at 800° C. for 10 sec serving also as baking was performed. The steel sheet was then subjected to magnetic domain refining treatment by electron beam irradiation.

The results of studying the magnetic properties and the film adhesion of each obtained steel sheet are shown in Table 4. As can be seen from the table, anchor parts according to the present disclosure were formed in the insulating coating. Consequently, the iron loss was effectively reduced. Thus, iron loss reduction by filmless mirror finishing was achieved. Moreover, the hysteresis loss was reduced to thus improve the iron loss. In addition, the adhesion between the insulating coating and the steel substrate was maintained with no need for a special process.

Example 4

Steel ingots having the same composition as in Example 3 were each subjected to the same processes to primary recrystallization annealing as in Example 2. After this, an annealing separator obtained by adding, to alumina as a main agent, 1.5 mass % (concentration C) of SnO having an average particle size D of 3.6 μm, a content ratio R of particles whose particle sizes were greater than or equal to four times the average particle size D of 2.2 vol %, and a particle size standard deviation of 1.5 μm was applied to the steel sheet in an application quantity A of 9 g/m². Here, ACR/D³ was 0.7. After the final annealing, the steel sheet was subjected to the same processes as in Example 2. The results of studying the magnetic properties and the film adhesion of each obtained steel sheet are shown in Table 4. As can be seen from the table, even in the case of using non-reactive Al₂O₃ in the annealing separator, anchor parts according to the present disclosure were formed in the insulating coating. As a result, favorable results were obtained for both the iron loss and the film adhesion.

TABLE 4

| | Anchor part | | | Evaluation | | |
|---|---|---|---|---|---|---|
| | Number of neck parts of 5 μm² or less | Number of neck parts of 10-40 μm² | Anchor depth | Iron loss $W_{17/50}$ | Bend adhesion peeling diameter | |
| No. | (/μm²) | (/μm²) | (μm) | (W/kg) | (mm) | Remarks |
| 1 | 0.027 | 0.008 | 2.5 | 0.62 | 30 | Example 3 |
| 2 | 0.023 | 0.007 | 2.3 | 0.63 | 30 | Example 4 |

REFERENCE SIGNS LIST 1 film
2 steel substrate
3 anchor part
4 neck part (area ratio: 10 μm² to 40 μm²)
5 neck part (area ratio: 5 μm² or less)
6 anchor part depth

The invention claimed is:

1. A grain-oriented electrical steel sheet comprising
an insulating film formed on a surface of a steel substrate of the grain-oriented electrical steel sheet,
wherein the insulating film partially enters into the steel substrate to form an anchor part,
a depth of the anchor part from the surface of the steel substrate is 3.5 μm or less, and
a number of neck parts of 5 μm² or less in area is 0.06/μm² or less and a number of neck parts of 10 μm² to 40 μm² in area is 0.005/μm² or more and 0.011/μm² or less, where each neck part is a remaining part of the insulating film on the surface of the steel substrate when peeling the insulating film from the steel substrate in a bend test for the grain-oriented electrical steel sheet, where the bend test is a test in which the grain-oriented electrical steel sheet is wound around each of various round bars having different diameters and film peeling is visually observed, and a sample having a film remaining part largest in diameter from among samples in which the film peeled is used for observation of neck parts.

2. A production method for the grain-oriented electrical steel sheet according to claim 1, the production method comprising:
subjecting a steel containing 2 mass % to 4 mass % of Si to hot rolling to obtain a steel sheet;
subjecting the steel sheet to cold rolling once, or twice or more with intermediate annealing therebetween, into a final thickness;
thereafter subjecting the steel sheet to primary recrystallization annealing;
thereafter applying an annealing separator to the steel sheet and then subjecting the steel sheet to final annealing; and
thereafter removing the annealing separator, applying an insulating coating to the steel sheet, and subjecting the steel sheet to flattening annealing,
wherein when the annealing separator containing, in a concentration C in mass %, an additive having a solubility in water of 3 g/L or less, a volume fraction R in vol % of particles whose sizes are greater than or equal to four times a cumulative 50% particle size D in μm, and a particle size standard deviation Sd in μm is applied in an application quantity A in g/m², the cumulative 50% particle size D, the volume fraction R, the particle size standard deviation Sd, the concentration C, and the application quantity A satisfy the following expressions:

$D \geq 1.8$, $Sd \leq 0.6 \cdot D$, and $0.15 \leq (A \cdot C \cdot R)/D^3 \leq 20$.

3. The production method according to claim 2, wherein MgO is used as a main agent in the annealing separator.

4. The production method according to claim 2, wherein a non-reactive oxide is used as a main agent in the annealing separator, and an oxygen coating amount on a surface of the steel sheet after the final annealing is limited to 0.1 g/m² or less.

5. The production method according to claim 3, wherein 1 mass % to 20 mass % of halogen is contained in the annealing separator, and the oxygen coating amount on the surface of the steel sheet after the final annealing is limited to 0.1 g/m² or less.

6. The production method according to claim 2, wherein an average roughness Sa of a surface of the steel sheet is adjusted to 0.3 μm or less and a maximum valley depth Sv of the surface of the steel sheet is adjusted to 2 μm or more and 5 μm or less, at any stage after final cold rolling for obtaining the final thickness and before the final annealing.

7. The production method according to claim 2, wherein the final annealing includes a treatment of holding the steel sheet at 800° C. to 950° C. for 20 hr to 100 hr.

8. The production method according to claim 3, wherein an average roughness Sa of a surface of the steel sheet is adjusted to 0.3 μm or less and a maximum valley depth Sv of the surface of the steel sheet is adjusted to 2 μm or more and 5 μm or less, at any stage after final cold rolling for obtaining the final thickness and before the final annealing.

9. The production method according to claim 4, wherein an average roughness Sa of a surface of the steel sheet is adjusted to 0.3 μm or less and a maximum valley depth Sv of the surface of the steel sheet is adjusted to 2 μm or more and 5 μm or less, at any stage after final cold rolling for obtaining the final thickness and before the final annealing.

10. The production method according to claim 5, wherein an average roughness Sa of a surface of the steel sheet is adjusted to 0.3 μm or less and a maximum valley depth Sv of the surface of the steel sheet is adjusted to 2 μm or more and 5 μm or less, at any stage after final cold rolling for obtaining the final thickness and before the final annealing.

11. The production method according to claim 3, wherein the final annealing includes a treatment of holding the steel sheet at 800° C. to 950° C. for 20 hr to 100 hr.

12. The production method according to claim 4, wherein the final annealing includes a treatment of holding the steel sheet at 800° C. to 950° C. for 20 hr to 100 hr.

13. The production method according to claim 5, wherein the final annealing includes a treatment of holding the steel sheet at 800° C. to 950° C. for 20 hr to 100 hr.

14. The production method according to claim 6, wherein the final annealing includes a treatment of holding the steel sheet at 800° C. to 950° C. for 20 hr to 100 hr.

15. The production method according to claim 8, wherein the final annealing includes a treatment of holding the steel sheet at 800° C. to 950° C. for 20 hr to 100 hr.

16. The production method according to claim 9, wherein the final annealing includes a treatment of holding the steel sheet at 800° C. to 950° C. for 20 hr to 100 hr.

17. The production method according to claim 10, wherein the final annealing includes a treatment of holding the steel sheet at 800° C. to 950° C. for 20 hr to 100 hr.

* * * * *